United States Patent
Pekkucuksen et al.

(10) Patent No.: US 12,238,424 B2
(45) Date of Patent: *Feb. 25, 2025

(54) REFERENCE FRAME SELECTION FOR MULTI-FRAME IMAGE PROCESSING PIPELINES AND OTHER APPLICATIONS

(71) Applicant: Samsung Electronics Co., Ltd., Suwon-si (KR)

(72) Inventors: Ibrahim Pekkucuksen, Plano, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,783

(22) Filed: Sep. 26, 2023

(65) Prior Publication Data

US 2024/0089606 A1    Mar. 14, 2024

Related U.S. Application Data

(63) Continuation of application No. 18/056,566, filed on Nov. 17, 2022, now Pat. No. 11,889,197.

(60) Provisional application No. 63/405,220, filed on Sep. 9, 2022.

(51) Int. Cl.
| | |
|---|---|
| *H04N 23/72* | (2023.01) |
| *G06T 5/40* | (2006.01) |
| *G06T 5/70* | (2024.01) |
| *G06T 7/11* | (2017.01) |
| *G06T 7/90* | (2017.01) |
| *G06T 11/20* | (2006.01) |

(Continued)

(52) U.S. Cl.
CPC .............. *H04N 23/72* (2023.01); *G06T 5/40* (2013.01); *G06T 5/70* (2024.01); *G06T 7/11* (2017.01); *G06T 7/90* (2017.01); *G06T 11/203* (2013.01); *G06T 11/40* (2013.01); *H04N 23/741* (2023.01); *G06T 2207/10024* (2013.01)

(58) Field of Classification Search
CPC ...... H04N 23/72; H04N 23/741; H04N 23/71; G06T 5/40; G06T 5/70; G06T 7/11; G06T 7/90; G06T 11/203; G06T 11/40; G06T 2207/10024
See application file for complete search history.

(56) References Cited

U.S. PATENT DOCUMENTS

| | | |
|---|---|---|
| 9,373,054 B2 | 6/2016 | Loui et al. |
| 9,449,374 B2 | 9/2016 | Nash et al. |
| 9,990,536 B2 | 6/2018 | Gren et al. |

(Continued)

*Primary Examiner* — Mekonnen D Dagnew (57) ABSTRACT

A method includes obtaining, using at least one processing device of an electronic device, multiple image frames having different exposure levels. The method also includes determining whether a moving saturated region is present in at least some of the image frames. The method further includes selecting one of the image frames as a reference frame, where the selected image frame depends on whether the moving saturated region is present in at least some of the image frames. The selected image frame may have a first exposure level when the moving saturated region is present in at least some of the image frames, and the selected image frame may have a second exposure level longer than the first exposure level when the moving saturated region is not present in the image frames.

20 Claims, 6 Drawing Sheets

(51) Int. Cl.
  *G06T 11/40*    (2006.01)
  *H04N 23/741*   (2023.01)

(56) References Cited

U.S. PATENT DOCUMENTS

| | | |
|---|---|---|
| 10,719,927 B2 | 7/2020 | Bala et al. |
| 10,805,649 B2 | 10/2020 | Pekkucuksen et al. |
| 10,911,691 B1 | 2/2021 | Le et al. |
| 2014/0362256 A1* | 12/2014 | Schulze ............. H04N 23/6845 |
| | | 382/284 |
| 2019/0342485 A1 | 11/2019 | Lee |
| 2020/0304697 A1* | 9/2020 | Sasaki ...................... H04N 1/00 |
| 2020/0396370 A1 | 12/2020 | Zhen et al. |
| 2022/0114709 A1 | 4/2022 | Rahmati et al. |
| 2022/0132016 A1 | 4/2022 | Wang et al. |
| 2022/0222776 A1 | 7/2022 | Porikli et al. |

\* cited by examiner

REFERENCE FRAME SELECTION FOR MULTI-FRAME IMAGE PROCESSING PIPELINES AND OTHER APPLICATIONS

CROSS-REFERENCE TO RELATED APPLICATIONS AND PRIORITY CLAIM

This application claims priority under 35 U.S.C. § 120 as a continuation of U.S. patent application Ser. No. 18/056,566 filed on Nov. 17, 2022, which claims priority under 35 U.S.C. § 119(e) to U.S. Provisional Patent Application No. 63/405,220 filed on Sep. 9, 2022. Both of these applications are hereby incorporated by reference in their entirety.

TECHNICAL FIELD

This disclosure relates generally to imaging systems. More specifically, this disclosure relates to reference frame selection for multi-frame image processing pipelines and other applications.

BACKGROUND

Many mobile electronic devices, such as smartphones and tablet computers, include cameras that can be used to capture still and video images. Multi-frame imaging is a technique that is often employed by mobile electronic devices and other image capture devices. In multi-frame imaging, multiple image frames of a scene are captured at or near the same time, and the image frames are blended or otherwise combined to produce a final image of the scene. In many instances, different image frames of a scene are captured using different exposure times. This approach can help to produce final images of scenes having high or wide dynamic range, which can significantly improve the visual quality of the final images.

SUMMARY

This disclosure relates to reference frame selection for multi-frame image processing pipelines and other applications.

In a first embodiment, an apparatus includes at least one imaging sensor configured to capture multiple image frames having different exposure levels. The apparatus also includes at least one processing device configured to determine whether a moving saturated region is present in at least some of the image frames and select one of the image frames as a reference frame, where the selected image frame depends on whether the moving saturated region is present in at least some of the image frames.

In a second embodiment, a method includes obtaining, using at least one processing device of an electronic device, multiple image frames having different exposure levels. The method also includes determining whether a moving saturated region is present in at least some of the image frames. The method further includes selecting one of the image frames as a reference frame, where the selected image frame depends on whether the moving saturated region is present in at least some of the image frames.

In a third embodiment, a non-transitory computer readable medium contains instructions that when executed cause at least one processor to obtain multiple image frames having different exposure levels and determine whether a moving saturated region is present in at least some of the image frames. The non-transitory computer readable medium also contains instructions that when executed cause the at least one processor to select one of the image frames as a reference frame, where the selected image frame depends on whether the moving saturated region is present in at least some of the image frames.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 6, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, many mobile electronic devices, such as smartphones and tablet computers, include cameras that can be used to capture still and video images. Multi-frame imaging is a technique that is often employed by mobile electronic devices and other image capture devices. In multi-frame imaging, multiple image frames of a scene are captured at or near the same time, and the image frames are blended or otherwise combined to produce a final image of the scene. In many instances, different image frames of a scene are captured using different exposure times. This approach can help to produce final images of scenes having high or wide dynamic range, which can significantly improve the visual quality of the final images.

One issue that routinely affects multi-frame imaging processes is blur. During a multi-frame capture operation, it is common for one or more objects in a scene being imaged to move, which can create motion blur in parts of one or more of the captured image frames. Also, it is common for an imaging device (such as handheld mobile devices like smartphones and tablet computers) to move while image frames are being captured, which can create motion blur in one or more of the captured image frames even if the scene being imaged is completely static. In addition, different amounts of motion blur can be created in image frames having different exposure times.

When image frames captured during a multi-frame capture operation are blended, one of the image frames is typically selected as a reference frame, and portions of image contents in one or more non-reference frames can be selected for blending with, or for replacement of, portions of image contents in the reference frame. Ordinarily, the reference frame is identified by selecting a predefined image frame from among a collection of captured image frames. For example, an image frame captured using an auto-exposure setting (often referred to as an "EV-0" exposure setting) can typically be selected for use. Unfortunately, this approach leads to the creation of moving saturated region artifacts when a shortest-exposure image frame is not used as the reference frame. That is, when a moving region within the captured image frames is saturated even at the shortest exposure level, that region can lead to the creation of an artifact during image frame blending or other image frame combination. This is because the location of the moving region in the shortest-exposure image frame can be different from the location of the corresponding region in a longer-exposure reference frame.

This disclosure provides various techniques for reference frame selection for multi-frame image processing pipelines and other applications. As described in more detail below, multiple image frames captured during a multi-frame capture operation can be obtained, and a determination can be made that two or more of the multiple image frames are available for selection as a reference frame. In some cases, the determination that two or more of the image frames are available for selection as the reference frame can be based on metadata associated with the image frames and based on which of the image frames are successfully aligned during image registration. For example, the metadata can be used to identify whether each image frame is suitable for use given one or more current conditions in a scene being imaged, such as current lighting conditions in the scene being imaged. The two or more image frames that are available for selection as the reference frame are associated with at least two different exposure levels.

A determination can also be made whether a moving saturated region is present in the two or more image frames. If so, an image frame having a first exposure level (such as an "EV-4" exposure setting) can be selected from among the two or more image frames. If not, an image frame having a second exposure level longer than the first exposure level (such as an "EV-2" exposure setting) can be selected from among the two or more image frames. In some cases, blur levels of at least two of the image frames can be compared, and a sharper image frame from among the at least two image frames can be selected based on the blur levels. For instance, if there are at least two image frames having the first exposure level or at least two image frames having the second exposure level that are available for selection as the reference frame, blur in the at least two image frames can be compared in order to select the sharper image frame for consideration as the reference frame. If none of the image frames having the first and second exposure levels can be selected as the reference frame, an image frame having a third exposure level (such as an EV-0 exposure setting) that is longer than the first and second exposure levels can be selected as the reference frame.

In this way, the disclosed techniques allow a more-suitable reference frame to be selected in a multi-frame image processing pipeline or other application. For example, the disclosed techniques can be used to select a sharper image frame for use as the reference frame (instead of simply using a predetermined image frame as the reference frame). This can be achieved regardless of the exposure levels of the image frames, and there is no requirement that the selected reference frame needs to have a predefined exposure level. Moreover, the disclosed techniques can support computationally-efficient blur level determinations and moving saturated region detections, which allows the best image frame (in terms of blur levels and moving saturated regions) to be selected as the reference frame in an efficient manner.

Figure 1:
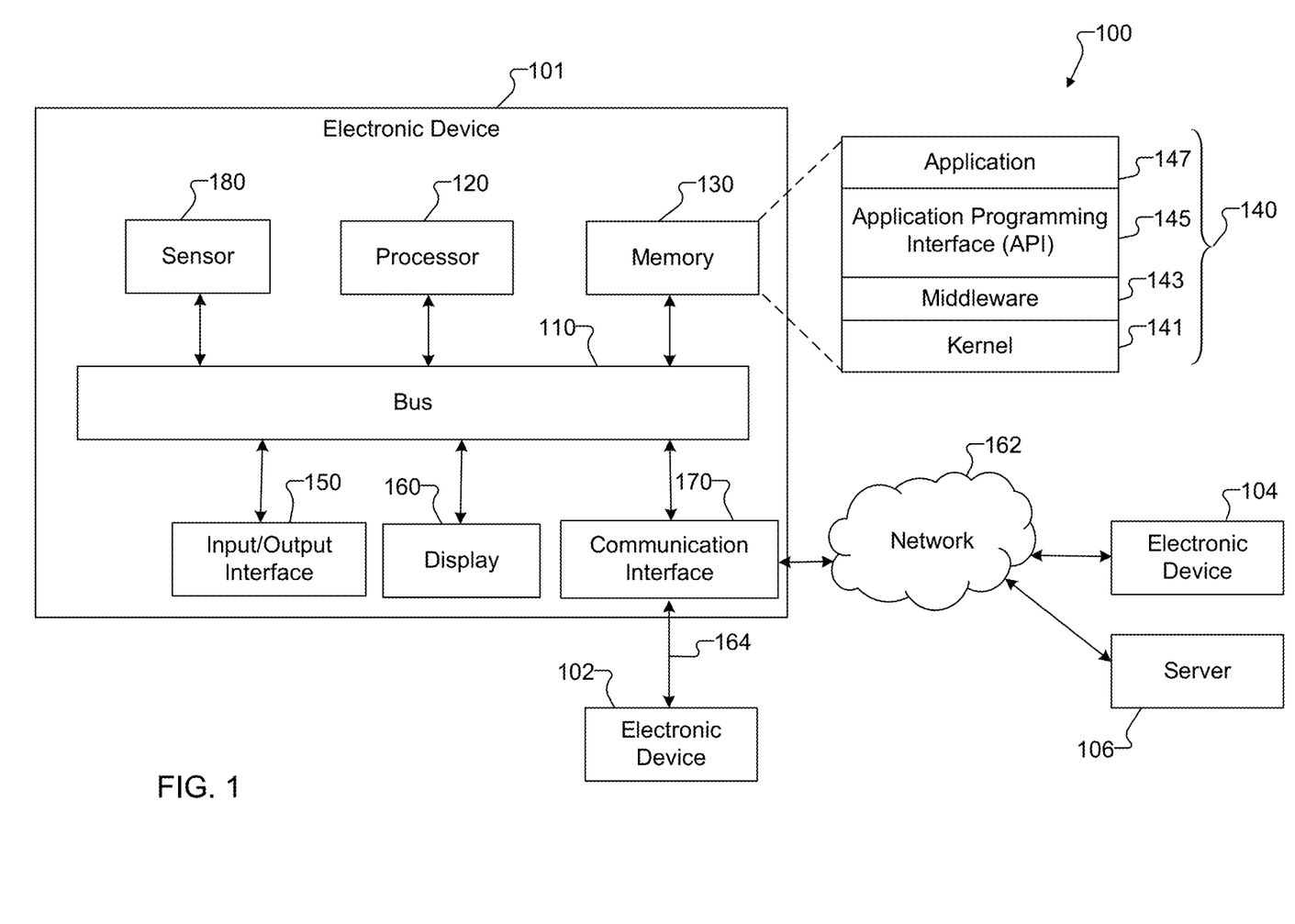
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to process input image frames and select a reference frame from among the input image frames. The processor 120 may also be used to perform one or more functions based on or using the selected reference frame, such as a multi-frame blending operation.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for processing input image frames, selecting a reference frame from among the input image frames, and performing one or more functions based on or using the selected reference frame. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 may include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th Generation (5G) wireless system, millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to process input image frames and select a reference frame from among the input image frames. The server 106 may also be used to perform one or more functions based on or using the selected reference frame, such as a multi-frame blending operation.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
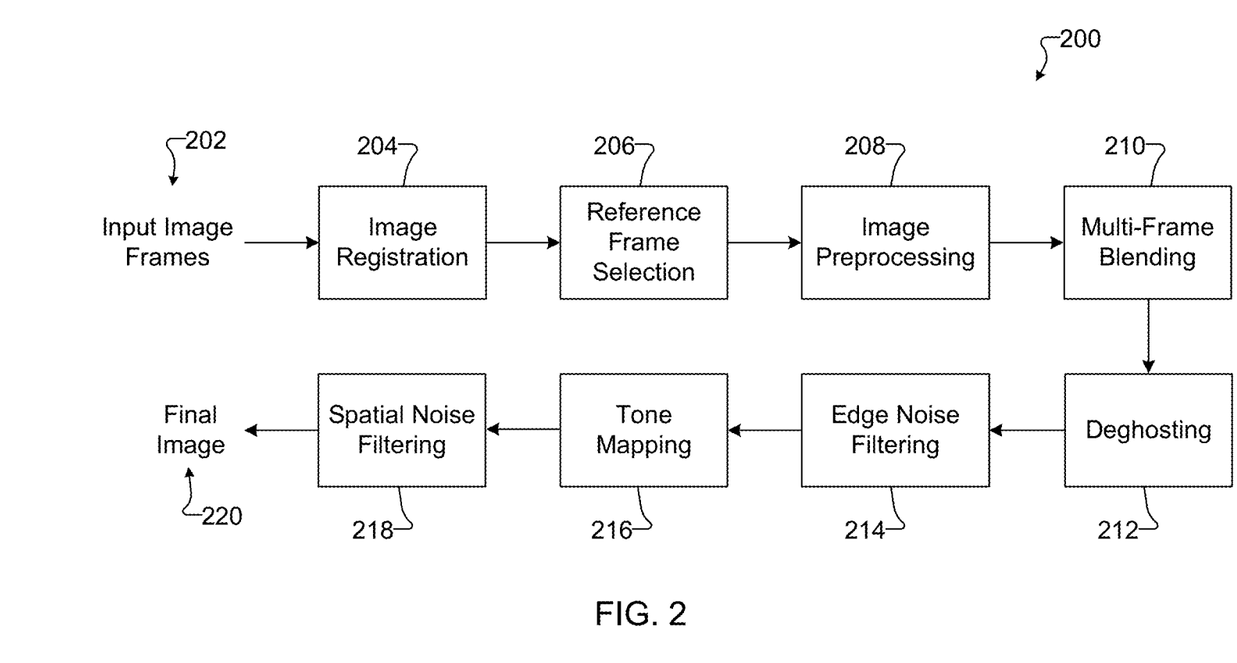
FIG. 2 illustrates an example multi-frame image processing pipeline in accordance with this disclosure.

FIG. 2 illustrates an example multi-frame image processing pipeline 200 in accordance with this disclosure. For ease of explanation, the multi-frame image processing pipeline 200 shown in FIG. 2 is described as being implemented on or supported by the electronic device 101 in the network configuration 100 of FIG. 1. However, the multi-frame image processing pipeline 200 shown in FIG. 2 could be implemented on or supported by any other suitable device(s) and in any other suitable system(s).

As shown in FIG. 2, the multi-frame image processing pipeline 200 generally operates to receive and process input image frames 202. Each input image frame 202 represents an image frame captured of a scene. Depending on the implementation, the input image frames 202 could be captured simultaneously using different cameras or other imaging sensors 180 of the electronic device 101 or captured sequentially using one or more cameras or other imaging sensors 180 of the electronic device 101. In some cases, the input image frames 202 can be captured in response to a capture event, such as when the processor 120 detects a user initiating image capture by depressing a hard or soft button of the electronic device 101. The input image frames 202 may have any suitable resolution(s), and the resolution of each input image frame 202 can depend on the capabilities of the imaging sensor(s) 180 in the electronic device 101 and possibly on one or more user settings affecting the resolution. In some embodiments, the input image frames 202 may represent raw image frames, RGB image frames, or image frames in any other suitable image data space.

The input image frames 202 may include image frames captured using different exposure levels, such as when the input image frames 202 include one or more shorter-exposure image frames and one or more longer-exposure image frames. As a particular example, the input image frames 202 may include one or more image frames captured at an EV-0 exposure level, one or more image frames captured at an EV-2 exposure level, and one or more image frames captured at an EV-4 exposure level. Note that these exposure levels are for illustration only and that image frames may be captured at other or additional exposure levels, such as EV-1, EV-3, EV-5, EV-6, or EV+1 exposure levels. In some cases, each input image frame 202 may be divided into multiple channels of data, such as when each input image frame 202 includes red, green, and blue (and optionally white) channels of image data. In particular embodiments, each channel of each input image frame 202 may include twelve-bit image data values.

The input image frames 202 are provided to an image registration function 204, which generally operates to align the input image frames 202 and produce aligned image frames. For example, the image registration function 204 may determine how one or more input image frames 202 would need to be warped or otherwise modified in order to more closely align one or more features in the image frames, and the image registration function 204 may then warp or otherwise modify the one or more image frames. Registration may be needed in order to compensate for misalignment caused by the electronic device 101 moving or rotating in between image captures, which causes objects in the input image frames 202 to move or rotate slightly (as is common with handheld devices). The image registration function 204 may use any suitable technique for aligning images. In some cases, the input image frames 202 can be aligned both geometrically and photometrically. In particular embodiments, the image registration function 204 can use global Oriented FAST and Rotated BRIEF (ORB) features and local features from a block search to identify how to align the input image frames 202. However, other implementations of the image registration function 204 could also be used. Note that one or more of the input image frames 202 may be discarded here, such as when the one or more input image frames 202 cannot be successfully aligned with other input image frames 202 by the image registration function 204.

A reference frame selection function 206 generally operates to process the aligned input image frames 202 in order to select one of the aligned input image frames 202 as a reference frame. The selected aligned input image frame 202 is used as a reference frame in subsequent processing operations, while one or more remaining aligned input image frames 202 can be treated as non-reference frames. The reference frame selection function 206 may use the techniques described below to select a reference frame, such as by selecting the reference frame based on blur level determinations and moving saturated region detections involving the aligned input image frames 202.

The aligned input image frames 202 are preprocessed using an image preprocessing function 208, which generally operates to perform any desired operation(s) using the aligned input image frames 202. For instance, the image preprocessing function 208 may perform image segmentation in order to identify discrete objects, foreground, and background in the aligned input image frames 202 or perform semantic correspondence identification in order to identify relationships between semantic contents in the aligned input image frames 202. The image preprocessing function 208 may include any other or additional function or functions applied to aligned or other image frames.

The preprocessed image frames 202 are provided to a multi-frame blending function 210, which generally operates to combine the preprocessed image frames 202 in order to produce a blended image. The multi-frame blending function 210 may use any suitable technique to combine image data from multiple image frames in order to produce a blended image. For example, the multi-frame blending function 210 may take the reference frame and replace one or more portions of the reference frame containing motion with one or more corresponding portions of shorter-exposure image frames. As a particular example, the multi-frame blending function 210 may perform a weighted blending operation to combine the pixel values contained in the preprocessed image frames 202. In general, this disclosure is not limited to any particular technique for combining image frames.

The blended image is provided to a deghosting function 212, which generally operates to perform deghosting or deblurring in the blended image. The deghosting function 212 may be implemented in any suitable manner, such as by using a machine learning model that has been trained to reduce blur in images. An edge noise filtering function 214 can be used to filter the image data of the blended image in order to remove noise from object edges, which can help to provide cleaner edges to objects in the blended image. The edge noise filtering function 214 may be implemented in any suitable manner. A tone mapping function 216 can be used to adjust colors in the blended image, which can be useful or important in various applications, such as when generating high dynamic range (HDR) images. For instance, since generating an HDR image often involves capturing multiple images of a scene using different exposures and combining the captured images to produce the HDR image, this type of processing can often result in the creation of unnatural tones within the HDR image. The tone mapping function 216 can therefore use one or more color mappings to adjust the colors contained in the blended image. The tone mapping function 216 may be implemented in any suitable manner. A spatial noise filtering function 218 can be used to spatially filter the contents of the blended image in order to remove noise from the blended image.

The post-processed image is output as a final image 220 of a scene, which may be stored, output, or used in any suitable manner. The final image 220 generally represents an image of a scene that is generated by the multi-frame image processing pipeline 200 based on the input image frames 202. Each input image frame 202 and the final image 220 may have any suitable resolution, which may vary based on (among other things) the imaging sensor(s) 180 being used. Note that the final image 220 may undergo additional processing if needed or desired.

It should be noted that the functions shown in or described with respect to FIG. 2 can be implemented in an electronic device 101, server 106, or other device(s) in any suitable manner. For example, in some embodiments, at least some of the functions shown in or described with respect to FIG. 2 can be implemented or supported using one or more software applications or other software instructions that are executed by the processor 120 of the electronic device 101, server 106, or other device(s). In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions.

Although FIG. 2 illustrates one example of a multi-frame image processing pipeline 200, various changes may be made to FIG. 2. For example, various components and functions in FIG. 2 may be combined, further subdivided, replicated, or rearranged according to particular needs. Also, one or more additional components or functions may be included if needed or desired. In addition, while FIG. 2 illustrates one example environment in which reference frame selection may be used, the techniques for reference frame selection described in this disclosure may be used in any other suitable environment.

Figure 3A:
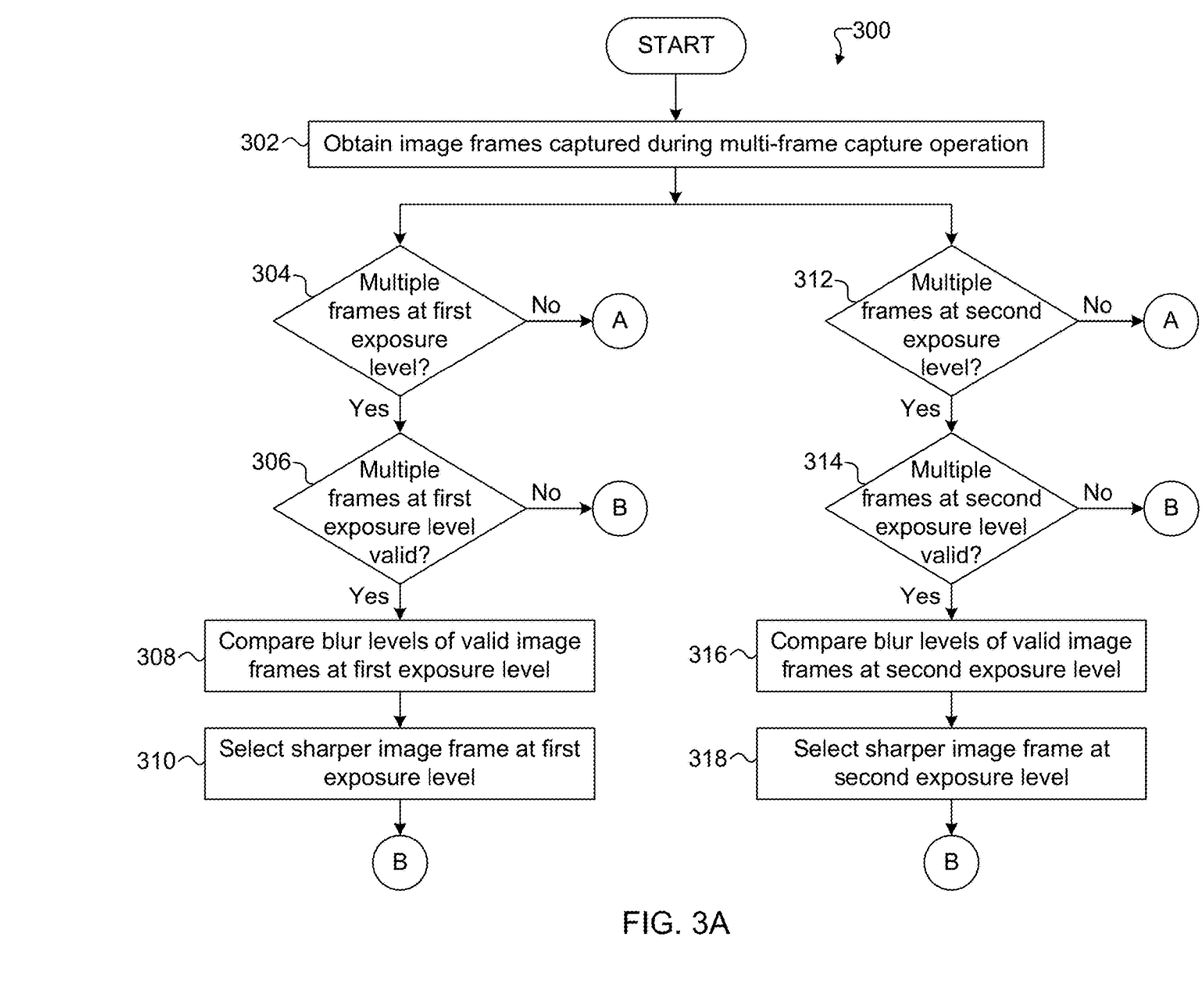
FIGS. 3A through 3C illustrate an example method for reference frame selection in a multi-frame image processing pipeline or other application in accordance with this disclosure.
Figure 3B:
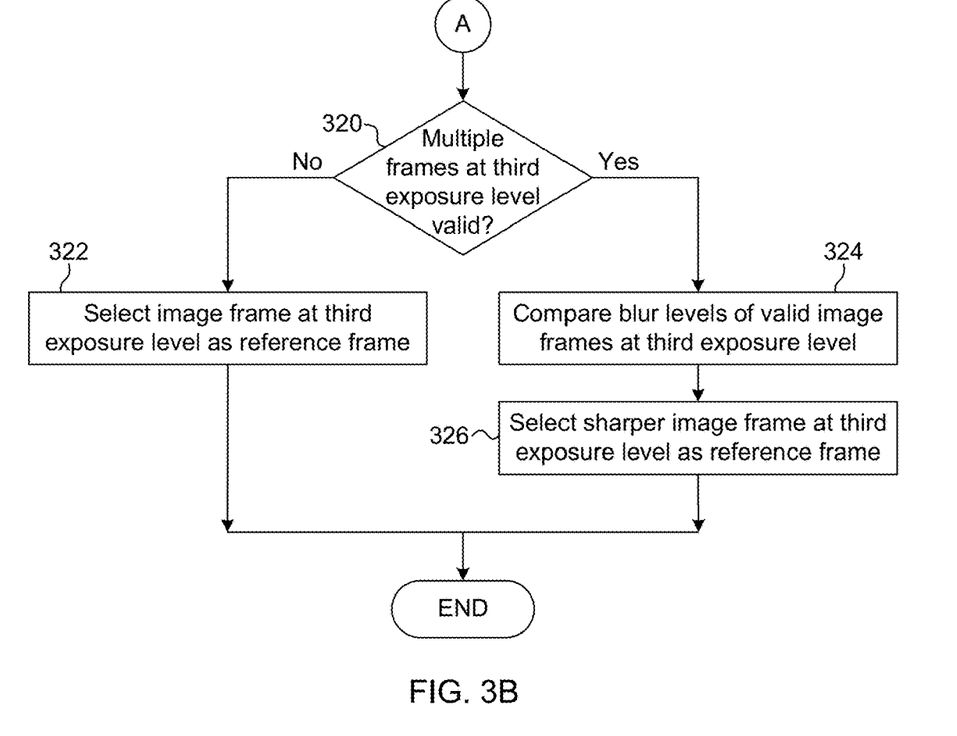
Figure 3C:
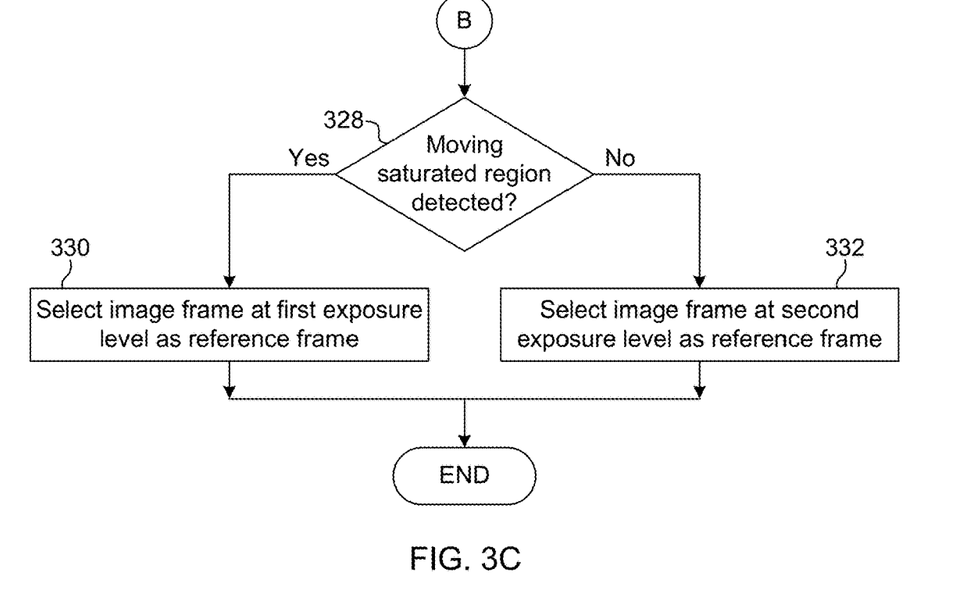

FIGS. 3A through 3C illustrate an example method 300 for reference frame selection in a multi-frame image processing pipeline or other application in accordance with this disclosure. For ease of explanation, the method 300 shown in FIG. 3 is described as being performed as part of the reference frame selection function 206 in the multi-frame image processing pipeline 200 shown in FIG. 2, which may be implemented on or supported by the electronic device 101 in the network configuration 100 of FIG. 1. However, the method 300 shown in FIG. 3 could be performed as part of any other suitable application that is implemented on or supported by any other suitable device(s) and in any other suitable system(s).

As shown in FIG. 3A, multiple input image frames are generated or otherwise obtained during a multi-frame capture operation at step 302. This may include, for example, the processor 120 of the electronic device 101 obtaining the input image frames 202 using one or more cameras or other imaging sensors 180 of the electronic device 101. The input image frames 202 may be obtained in various ways, such as simultaneously using multiple cameras or other imaging sensors 180 or sequentially using a single camera or other imaging sensor 180.

A determination is made whether there are multiple input image frames available at a first exposure level at step 304. This may include, for example, the processor 120 of the electronic device 101 determining whether multiple input image frames 202 at the EV-4 exposure level (or some other first exposure level) have been obtained and are suitable for use. In some cases, the determination of whether the input image frames 202 at the first exposure level are suitable for use can be based on metadata associated with those input image frames 202. For instance, the metadata can be used to identify whether each input image frame 202 is suitable for use given one or more current conditions in a scene being imaged, such as current lighting conditions in the scene being imaged. Thus, if an input image frame 202 has an ISO level that is too high or an exposure time that is too low, this may indicate that the quality of the input image frame 202 is not good, so that input image frame 202 may be identified as being unsuitable or ineligible for use as the reference frame. As a particular example, during image capture of a nighttime or other dark scene, an EV-4 input image frame may be considered suitable or eligible for use as the reference frame if (i) its ISO level is less than or equal to 200 and (ii) either (a) its exposure time (ET) is greater than 24 milliseconds and its luma median (LM) is greater than five or (b) its luma median is greater than sixteen. This can be expressed in the following manner.

$ISO ≤ 200$ AND $[(ET>24$ ms AND $LM>5)$ OR $LM>16]$

However, any other suitable criterion or criteria may be used here.

If there are multiple input image frames at the first exposure level that are suitable for use as the reference frame, a determination is made whether the multiple input image frames at the first exposure level are valid at step 306. This may include, for example, the processor 120 of the electronic device 101 determining whether the input image frames 202 at the EV-4 exposure level (or some other first exposure level) have been successfully aligned by the image registration function 204. If an input image frame 202 cannot be successfully aligned by the image registration function 204, that input image frame 202 can be excluded. Note that any other or additional criterion or criteria may be used here when determining if input image frames 202 at the first exposure level are valid.

If there are multiple input image frames at the first exposure level that are suitable for use as the reference frame and valid, blur levels of those input image frames are compared at step 308, and a sharper image frame from among those input image frames is selected at step 310. This may include, for example, the processor 120 of the electronic device 101 using the technique described below (or any other suitable technique) to measure blur levels in the input image frames 202 at the first exposure level and selecting the input image frame 202 at the first exposure level having the smallest blur level. In some cases, the blur levels may be expressed as blur scores, and the processor 120 of the electronic device 101 may select the input image frame 202 at the first exposure level having the smallest blur score.

Similarly, a determination is made whether there are multiple input image frames available at a second exposure level at step 312. This may include, for example, the processor 120 of the electronic device 101 determining whether multiple input image frames 202 at the EV-2 exposure level (or some other second exposure level) have been obtained and are suitable for use. In some cases, the determination of whether the input image frames 202 at the second exposure level are suitable for use can be based on metadata associated with those input image frames 202. For instance, the metadata can be used to identify whether each input image frame 202 is suitable for use given one or more current conditions in a scene being imaged, such as current lighting conditions in the scene being imaged. Thus, if an input image frame 202 has an ISO level that is too high or an exposure time that is too low, this may indicate that the quality of the input image frame 202 is not good, so that input image frame 202 may be identified as being unsuitable or ineligible for use as the reference frame. As a particular example, during image capture of a nighttime or other dark scene, an EV-2 input image frame may be considered suitable or eligible for use as the reference frame if (i) its ISO level is less than or equal to 800 and (ii) either (a) its exposure time is greater than 40 milliseconds and its luma median is greater than twelve or (b) its luma median is greater than twenty-four. This can be expressed in the following manner.

$ISO ≤ 800$ AND $[(ET>40$ ms AND $LM>12)$ OR $LM>24]$

However, any other suitable criterion or criteria may be used here.

If there are multiple input image frames at the second exposure level that are suitable for use as the reference frame, a determination is made whether the multiple input image frames at the second exposure level are valid at step 314. This may include, for example, the processor 120 of the electronic device 101 determining whether the input image frames 202 at the EV-2 exposure level (or some other second exposure level) have been successfully aligned by the image registration function 204. If an input image frame 202 cannot be successfully aligned by the image registration function 204, that input image frame 202 can be excluded. Note that any other or additional criterion or criteria may be used here when determining if multiple input image frames 202 at the second exposure level are valid.

If there are multiple input image frames at the second exposure level that are suitable for use as the reference frame and valid, blur levels of those input image frames are compared at step 316, and a sharper image frame from among those input image frames is selected at step 318. This may include, for example, the processor 120 of the electronic device 101 using the technique described below (or any other suitable technique) to measure blur levels in the input image frames 202 at the second exposure level and selecting the input image frame 202 at the second exposure level having the smallest blur level. In some cases, the blur levels may be expressed as blur scores, and the processor 120 of the electronic device 101 may select the input image frame 202 at the second exposure level having the smallest blur score.

If there are not multiple input image frames at the first exposure level and multiple input image frames at the second exposure level that are suitable for use (as determined in steps 304 and 312), the process can move to FIG. 3B. As shown in FIG. 3B, a determination is made whether there are multiple input image frames available at a third exposure level at step 320. This may include, for example, the processor 120 of the electronic device 101 determining whether multiple input image frames 202 at the EV-0 exposure level (or some other third exposure level) have been obtained. If not, the single input image frame at the third exposure level is selected as the reference frame at step 322. Otherwise, blur levels of those input image frames are compared at step 324, and a sharper image frame from among those input image frames is selected as the reference frame at step 326. This may include, for example, the processor 120 of the electronic device 101 using the technique described below (or any other suitable technique) to measure blur levels in the input image frames 202 at the third exposure level and selecting the input image frame 202 at the third exposure level having the smallest blur level. In some cases, the blur levels may be expressed as blur scores, and the processor 120 of the electronic device 101 may select the input image frame 202 at the third exposure level having the smallest blur score. Note that if there are more than two input image frames 202 at the third exposure level, blur levels for only a subset of the input image frames 202 (such as the first two input image frames 202 obtained at the third exposure level) may be determined, and the reference frame may be selected from among that subset of the input image frames 202.

From any of steps 306, 310, 314, and 318, the process can move to FIG. 3C. As shown in FIG. 3C, a determination is made whether at least one moving saturated region is detected in the input image frames at step 328. This may include, for example, the processor 120 of the electronic device 101 using one of the techniques described below (or any other suitable technique) to determine whether input image frames 202 having shorter exposure levels (such as the EV-2 and EV-4 exposure levels) contain a region that is saturated and moving within those input image frames 202. If not, an input image frame having the first exposure level is selected as the reference frame at step 330. This may include, for example, the processor 120 of the electronic device 101 selecting the single input image frame 202 having the EV-4 exposure level (or some other first exposure level) as the reference frame or selecting the sharper input image frame 202 having the first exposure level (as selected in step 310) as the reference frame. Otherwise, an input image frame having the second exposure level is selected as the reference frame at step 332. This may include, for example, the processor 120 of the electronic device 101 selecting the single input image frame 202 having the EV-2 exposure level (or some other second exposure level) as the reference frame or selecting the sharper input image frame 202 having the second exposure level (as selected in step 318) as the reference frame.

Although FIGS. 3A through 3C illustrate one example of a method 300 for reference frame selection in a multi-frame image processing pipeline 200 or other application, various changes may be made to FIGS. 3A through 3C. For example, while shown as having steps arranged in series and in parallel, various steps in FIGS. 3A through 3C could be rearranged, occur serially (if shown in parallel), occur in parallel (if shown serially), or occur any suitable number of times. Also, it is assumed here that input image frames 202 are captured using the EV-4, EV-2, and EV-0 exposure levels. However, input image frames 202 at any other or additional exposure levels may be captured and processed, and there may be more than three exposure levels used here. In addition, it is assumed here that an input image frame 202 captured at the third exposure level (such as the EV-0 exposure level) is selected as the reference frame if one or more input image frames 202 captured at the first exposure level (such as the EV-4 exposure level) and one or more input image frames 202 captured at the second exposure level (such as the EV-2 exposure level) are not suitable for use. However, it is possible to select from among input image frames 202 at the first or second exposure level and at the third exposure level, even if input image frames 202 at one of the first and second exposure levels are not available.

Figure 4:
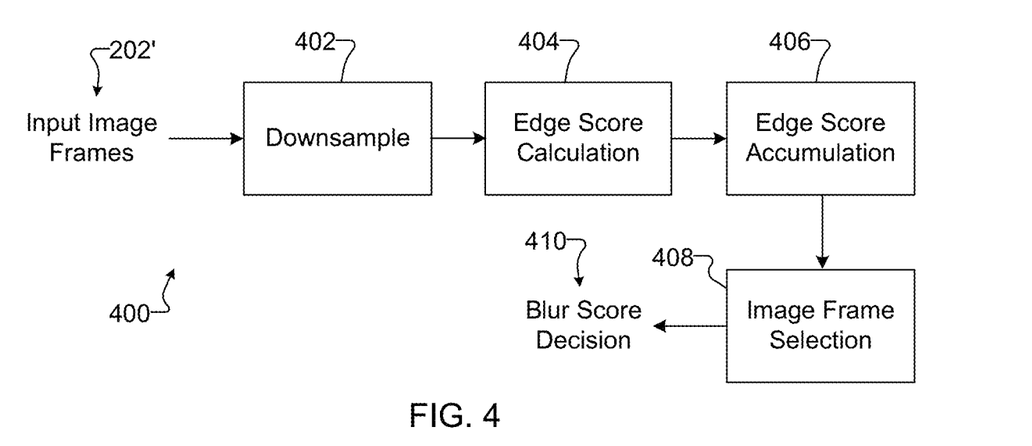
FIG. 4 illustrates an example technique for measuring blur in image frames for use in the multi-frame image processing pipeline of FIG. 2 in accordance with this disclosure.

FIG. 4 illustrates an example technique 400 for measuring blur in image frames for use in the multi-frame image processing pipeline 200 of FIG. 2 in accordance with this disclosure. For ease of explanation, the technique 400 shown in FIG. 4 is described as being performed as part of steps 308-310, 316-318, and 324-326 in the method 300 shown in FIG. 3, which may be performed using the multi-frame image processing pipeline 200 shown in FIG. 2 and implemented on or supported by the electronic device 101 in the network configuration 100 of FIG. 1. However, the technique 400 shown in FIG. 4 could be performed as part of any other suitable method or application that is implemented on or supported by any other suitable device(s) and in any other suitable system(s).

As shown in FIG. 4, each of multiple input image frames 202' can be provided to a downsampling function 402, which generally operates to decrease the size of each of the input image frames 202'. The downsampling function 402 can use any suitable technique to downsample input image frames 202', such as by averaging or otherwise combining adjacent pixel values in each input image frame 202'. In some cases, the input image frames 202' can be downsampled by a factor of eight, although other ratios may be used here. Note that the image frames here are denoted as image frames 202' (rather than image frames 202) since not all input image frames 202 may need to undergo blur measurements.

The downsampled image frames are provided to an edge score calculation function 404, which generally operates to generate scores or other indicators regarding the strengths of edges contained in the downsampled image frames. The edge score calculation function 404 can use any suitable technique to generates scores or other indicators of edge strengths in image frames. In some embodiments, for instance, edge scores can be calculated using a 3×3 filter referred to as an edge strength filter (ESF). Here, a 3-3 window can be moved within each downsampled image frame, and pixel values within the window can be compared. For example, the edge strength filter can compare the pixel values in each set of two pixels that are opposite each other about the center pixel in the window. This results in a comparison of pixel values along a horizontal axis, a vertical axis, and both diagonal axes of the window. In this way, the edge strength filter can detect an edge, such as based on a large change in the luminance or other values of the compared pixels, regardless of whether the edge is horizontally, vertically, or diagonally disposed within the window. This allows the edge strength filter to detect changes in luminance or other values of pixels that indicate edges or textures in an image frame. This approach is described further in U.S. Pat. No. 10,805,649 (which is hereby incorporated by reference in its entirety).

The edge scores are provided to an edge score accumulation function 406, which generally operates to sum or otherwise combine the edge scores determined for each downsampled input image frame. The resulting values can represent blur scores for the downsampled input image frames. An image frame selection function 408 generally operates to select the input image frame 202' having the best blur score, such as the lowest blur score. This results in the generation of a blur score decision 410, which can represent the selected input image frame 202'. Note that this approach effectively uses the strengths of edges in the downsampled image frames as a proxy for measuring the sharpness of the input image frames. As noted above, downsampling by a factor of eight is one option that can be used here and may work well both in terms of filtering out noise and in terms of reducing the number of computations (but other ratios can be used).

It should be noted that the functions shown in or described with respect to FIG. 4 can be implemented in an electronic device 101, server 106, or other device(s) in any suitable manner. For example, in some embodiments, at least some of the functions shown in or described with respect to FIG. 4 can be implemented or supported using one or more software applications or other software instructions that are executed by the processor 120 of the electronic device 101, server 106, or other device(s). In other embodiments, at least some of the functions shown in or described with respect to FIG. 4 can be implemented or supported using dedicated hardware components. In general, the functions shown in or described with respect to FIG. 4 can be performed using any suitable hardware or any suitable combination of hardware and software/firmware instructions.

Although FIG. 4 illustrates one example of a technique 400 for measuring blur in image frames for use in the multi-frame image processing pipeline 200 of FIG. 2, various changes may be made to FIG. 4. For example, various components and functions in FIG. 4 may be combined, further subdivided, replicated, or rearranged according to particular needs. Also, one or more additional components or functions may be included if needed or desired. Moreover, the edge score calculation function 404 may use an edge strength filter having any other suitable size and is not limited to the use of a 3-3 window. Further, any other suitable technique may be used here to measure edge strength or image sharpness of input image frames.

In addition, it is assumed in the discussion above that edge strengths in all portions of the downsampled input image frames can be weighted evenly by the edge score accumulation function 406. However, this need not be the case. In other embodiments, edges detected in one or more areas of the downsampled input image frames can be weighted more or less than edges detected in one or more other areas of the downsampled input image frames by the edge score accumulation function 406. Thus, as an example, edges detected in a central region of each downsampled input image frame may be weighted more heavily by the edge score accumulation function 406 than edges detected in non-central regions of each downsampled input image frame. As another example, edges detected in a face box or other facial boundary (a boundary identified around a person's face) of each downsampled input image frame may be weighted more heavily by the edge score accumulation function 406 than edges detected in non-face boxes or other non-facial boundaries of each downsampled input image frame.

Figure 5:
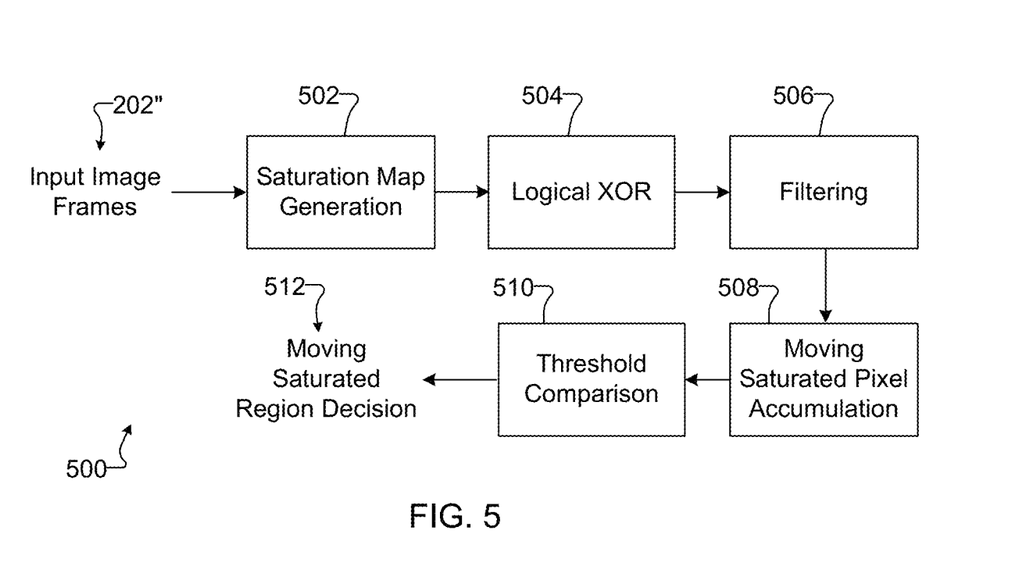
FIGS. 5 and 6 illustrate example techniques for detecting moving saturated regions in image frames for use in the multi-frame image processing pipeline of FIG. 2 in accordance with this disclosure.
Figure 6:
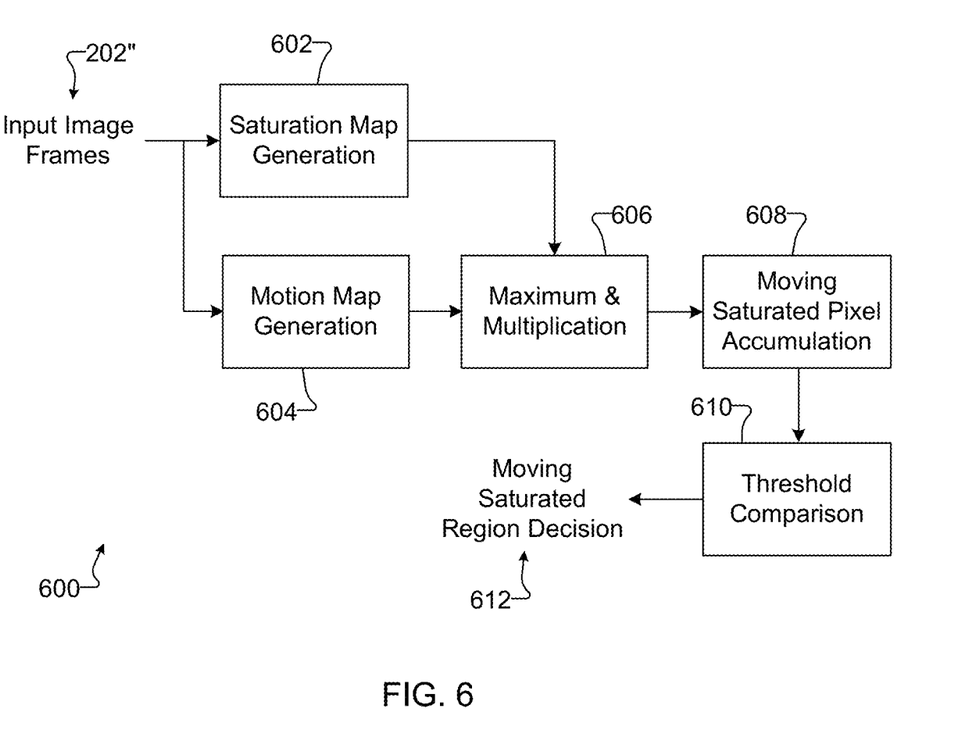

FIGS. 5 and 6 illustrate example techniques 500 and 600 for detecting moving saturated regions in image frames for use in the multi-frame image processing pipeline 200 of FIG. 2 in accordance with this disclosure. For ease of explanation, the techniques 500 and 600 shown in FIGS. 5 and 6 are described as being performed as part of step 328 in the method 300 shown in FIG. 3, which may be performed using the multi-frame image processing pipeline 200 shown in FIG. 2 and implemented on or supported by the electronic device 101 in the network configuration 100 of FIG. 1. However, the techniques 500 and 600 shown in FIGS. 5 and 6 could be performed as part of any other suitable method or application that is implemented on or supported by any other suitable device(s) and in any other suitable system(s).

As shown in FIG. 5, each of multiple input image frames 202" can be provided to a saturation map generation function 502, which generally operates to produce a saturation map for each input image frame 202". The saturation map generation function 502 can use any suitable technique to generate saturation maps for input image frames 202". For example, the saturation map generation function 502 can compare luminance or other pixel values in each input image frame 202" to a threshold value, and the saturation map for each input image frame 202" can identify which pixels in the corresponding input image frame 202" equal or exceed the threshold. Note that the image frames here are denoted as image frames 202" (rather than image frames 202 or image frames 202') since not all input image frames 202 or 202' may need to undergo moving saturated region detection.

The saturation maps are provided to a logical XOR operation 504, which generally operates to perform logical XOR operations in order to detect which pixel locations in the saturation maps are not consistently associated with identified saturation in the input image frames 202". For example, when a saturated region does not move within the input image frames 202", the saturation maps for those input image frames 202" can identify the saturated region in approximately the same locations, so a logical XOR of those saturation maps would exclude that region (since it does not move and the saturation maps have equal values in approximately the same locations). When a saturated region does move within the input image frames 202", the saturation maps for those input image frames 202" can identify the saturated region in different locations, so a logical XOR of those saturation maps would include at least a portion of that region (since it moves and the saturation maps have different values in certain locations). This results in the creation of a moving saturated region map, which indicates if (and to what extent) one or more saturated regions are moving within the input image frames 202".

A filtering operation 506 can be used to filter the moving saturated region map in order to reduce false positive identification of a moving saturated region. In some cases, for instance, the filtering operation 506 can use a 3×3 minimum filter, which moves a 3-3 window around the moving saturated region map. At each location of the 3×3 window, the minimum pixel value in the window is identified, and all pixel values in the window are replaced with the minimum pixel value. Note, however, that the filtering operation 506 can use any other suitable technique to filter the moving saturated region map. The result of the filtering operation 506 is a filtered moving saturated region map.

The filtered moving saturated region map is provided to a moving saturated pixel accumulation function 508, which generally operates to count or otherwise accumulate the pixels in the filtered moving saturated region map that identify at least one moving saturated region. The resulting value may represent the total number of pixels in the filtered moving saturated region map that identify at least one moving saturated region. The resulting value can be provided to a threshold comparison function 510, which can compare the value to a threshold value and produce a moving saturated region decision 512. The moving saturated region decision 512 represents a final determination by the threshold comparison function 510 of whether at least one moving saturated region is contained in the input image frames 202". Any suitable threshold value may be used here and can depend (among other things) on the number of pixels contained in the input image frames 202". In some cases, the threshold value may represent a value between twenty and five hundred (inclusive) depending on how strict a user or designer wants to be in terms of avoiding moving saturated regions. However, any other suitable threshold value or range of threshold values may be used here. The threshold comparison function 510 here may be used in step 328 of FIG. 3C to determine whether an image frame having a first exposure level is selected as a reference frame (if the accumulated pixels exceed the threshold value) or whether an image frame having a second exposure level is selected as the reference frame (if the accumulated pixels do not exceed the threshold value).

As shown in FIG. 6, each of multiple input image frames 202" can be provided to a saturation map generation function 602, which may be the same as or similar to the saturation map generation function 502 described above. The input image frames 202" are also provided to a motion map generation function 604, which generally operates to produce a motion map identifying pixel locations within the input image frames 202" where motion is estimated to occur. In some cases, the motion map generation function 604 may represent a portion of the functionality of the deghosting function 212, since deghosting often involves generating motion maps that identify motion between image frames in order to identify locations where deghosting is needed. The motion map generation function 604 can use any suitable technique to identify motion between input image frames 202". In particular embodiments, the techniques for generating motion maps as provided in U.S. Pat. No. 10,805,649 may be used.

A maximum and multiplication function 606 receives the saturation maps and the motion map. The "maximum" portion of the maximum and multiplication function 606 can identify, for each pixel location in the saturation maps, a maximum pixel value contained in any of the saturation maps at that pixel location. In other words, the maximum and multiplication function 606 here is selecting the maximum value contained in any of the saturation maps for each individual pixel location in the saturation maps. The "multiplication" portion of the maximum and multiplication function 606 can multiply the selected maximum value for each pixel location in the saturation maps and a corresponding pixel value at the same pixel location in the motion map. Repeating this across all pixel locations leads to the generation of a moving saturated region map, which represents a combination of locations identified as being saturated in any of the input image frames 202" and locations identified as containing motion.

The moving saturated region map is provided to a moving saturated pixel accumulation function 608, which generally operates to count or otherwise accumulate the pixels in the moving saturated region map that identify at least one moving saturated region. The resulting value may represent the total number of pixels in the moving saturated region map that identify at least one moving saturated region. The resulting value can be provided to a threshold comparison function 610, which can compare the value to a threshold value and produce a moving saturated region decision 612. The moving saturated region decision 612 represents a final determination by the threshold comparison function 610 of whether at least one moving saturated region is contained in the input image frames 202". Any suitable threshold value may be used here and can depend (among other things) on the number of pixels contained in the input image frames 202". In some cases, the threshold value may represent a value between twenty and five hundred (inclusive) depending on how strict a user or designer wants to be in terms of avoiding moving saturated regions. However, any other suitable threshold value or range of threshold values may be used here. The threshold comparison function 610 here may be used in step 328 of FIG. 3C to determine whether an image frame having a first exposure level is selected as a reference frame (if the accumulated pixels exceed the threshold value) or whether an image frame having a second exposure level is selected as the reference frame (if the accumulated pixels do not exceed the threshold value).

Depending on how these two techniques 500 and 600 are implemented, it is possible that the technique 600 in FIG. 6 may be more reliable or accurate in terms of identifying moving saturated regions in input image frames 202". However, the technique 600 may also involve the performance of larger numbers of computations. It is therefore possible to use a single technique 500 or 600 or to provide both techniques 500 and 600 and allow switching between the techniques 500 and 600 depending on the particular implementation.

It should be noted that the functions shown in or described with respect to each of FIGS. 5 and 6 can be implemented in an electronic device 101, server 106, or other device(s) in any suitable manner. For example, in some embodiments, at least some of the functions shown in or described with respect to each of FIGS. 5 and 6 can be implemented or supported using one or more software applications or other software instructions that are executed by the processor 120 of the electronic device 101, server 106, or other device(s). In other embodiments, at least some of the functions shown in or described with respect to each of FIGS. 5 and 6 can be implemented or supported using dedicated hardware components. In general, the functions shown in or described with respect to each of FIGS. 5 and 6 can be performed using any suitable hardware or any suitable combination of hardware and software/firmware instructions.

Although FIGS. 5 and 6 illustrate examples of techniques 500 and 600 for detecting moving saturated regions in image frames for use in the multi-frame image processing pipeline 200 of FIG. 2, various changes may be made to FIGS. 5 and 6. For example, various components and functions in each of FIGS. 5 and 6 may be combined, further subdivided, replicated, or rearranged according to particular needs. Also, one or more additional components or functions may be included in each of FIGS. 5 and 6 if needed or desired. In addition, any other suitable technique may be used here to detect the presence of moving saturated regions in image frames.

Although this disclosure has been described with reference to various example embodiments, various changes and modifications may be suggested to one skilled in the art. It is intended that this disclosure encompass such changes and modifications as fall within the scope of the appended claims.

What is claimed is:

1. An apparatus comprising:
at least one imaging sensor configured to capture multiple image frames having different exposure levels; and
at least one processing device configured to:
determine whether a moving saturated region is present in at least some of the image frames; and
select one of the image frames as a reference frame, the selected image frame depending on whether the moving saturated region is present in at least some of the image frames and a blur level of the selected image frame.

2. The apparatus of claim 1, wherein:
the selected image frame has a first exposure level when the moving saturated region is present in at least some of the image frames; and
the selected image frame has a second exposure level longer than the first exposure level when the moving saturated region is not present in the image frames.

3. The apparatus of claim 2, wherein the at least one processing device is further configured to:
in response to determining that at least two of the image frames are successfully aligned and have the first exposure level, compare blur levels of the at least two image frames having the first exposure level and select a sharper image frame having the first exposure level; and in response to determining that at least two of the image frames are successfully aligned and have the second exposure level, compare blur levels of the at least two image frames having the second exposure level and select a sharper image frame having the second exposure level; and wherein the selected image frame represents one of: the sharper image frame having the first exposure level or the sharper image frame having the second exposure level.

4. The apparatus of claim 2, wherein the at least one processing device is further configured, in response to determining that none of the image frames having the first and second exposure levels is suitable for use as the reference frame, to select at least one of the image frames having a third exposure level longer than the second exposure level.

5. The apparatus of claim 1, wherein the at least one processing device is further configured to determine that two or more of the image frames are available for selection as the reference frame, the selected image frame representing one of the two or more image frames.

6. The apparatus of claim 5, wherein the at least one processing device is configured to determine that the two or more image frames are available for selection as the reference frame based on (i) metadata associated with the image frames and (ii) an alignment result associated with an image registration operation involving the image frames.

7. The apparatus of claim 1, wherein the at least one processing device is configured to determine whether the moving saturated region is present in at least some of the image frames based on saturation maps associated with two or more of the image frames.

8. A method comprising:
obtaining, using at least one processing device of an electronic device, multiple image frames having different exposure levels;
determining whether a moving saturated region is present in at least some of the image frames; and
selecting one of the image frames as a reference frame, the selected image frame depending on whether the moving saturated region is present in at least some of the image frames and a blur level of the selected image frame.

9. The method of claim 8, wherein:
the selected image frame has a first exposure level when the moving saturated region is present in at least some of the image frames; and
the selected image frame has a second exposure level longer than the first exposure level when the moving saturated region is not present in the image frames.

10. The method of claim 9, further comprising:
in response to determining that at least two of the image frames are successfully aligned and have the first exposure level, comparing blur levels of the at least two image frames having the first exposure level and selecting a sharper image frame having the first exposure level; and in response to determining that at least two of the image frames are successfully aligned and have the second exposure level, comparing blur levels of the at least two image frames having the second exposure level and selecting a sharper image frame having the second exposure level;

wherein the selected image frame represents one of: the sharper image frame having the first exposure level or the sharper image frame having the second exposure level.

11. The method of claim 9, further comprising:
in response to determining that none of the image frames having the first and second exposure levels is suitable for use as the reference frame, selecting at least one of the image frames having a third exposure level longer than the second exposure level.

12. The method of claim 8, further comprising:
determining that two or more of the image frames are available for selection as the reference frame, the selected image frame representing one of the two or more image frames.

13. The method of claim 12, wherein determining that the two or more image frames are available for selection as the reference frame comprises:
determining that the two or more image frames are available for selection as the reference frame based on (i) metadata associated with the image frames and (ii) an alignment result associated with an image registration operation involving the image frames.

14. The method of claim 8, wherein determining whether the moving saturated region is present in at least some of the image frames comprises:
determining whether the moving saturated region is present in at least some of the image frames based on saturation maps associated with two or more of the image frames.

15. A non-transitory computer readable medium containing instructions that when executed cause at least one processor to:
obtain multiple image frames having different exposure levels;
determine whether a moving saturated region is present in at least some of the image frames; and
select one of the image frames as a reference frame, the selected image frame depending on whether the moving saturated region is present in at least some of the image frames and a blur level of the selected image frame.

16. The non-transitory computer readable medium of claim 15, wherein:
the selected image frame has a first exposure level when the moving saturated region is present in at least some of the image frames; and
the selected image frame has a second exposure level longer than the first exposure level when the moving saturated region is not present in the image frames.

17. The non-transitory computer readable medium of claim 16, further containing instructions that when executed cause the at least one processor to:
in response to determining that at least two of the image frames are successfully aligned and have the first exposure level, compare blur levels of the at least two image frames having the first exposure level and select a sharper image frame having the first exposure level; and in response to determining that at least two of the image frames are successfully aligned and have the second exposure level, compare blur levels of the at least two image frames having the second exposure level and select a sharper image frame having the second exposure level;

wherein the selected image frame represents one of: the sharper image frame having the first exposure level or the sharper image frame having the second exposure level.

18. The non-transitory computer readable medium of claim 16, further containing instructions that when executed cause the at least one processor to:
in response to determining that none of the image frames having the first and second exposure levels is suitable for use as the reference frame, select at least one of the image frames having a third exposure level longer than the second exposure level.

19. The non-transitory computer readable medium of claim 15, further containing instructions that when executed cause the at least one processor to determine that two or more of the image frames are available for selection as the reference frame, the selected image frame representing one of the two or more image frames.

20. The non-transitory computer readable medium of claim 19, wherein the instructions that when executed cause the at least one processor to determine that the two or more image frames are available for selection as the reference frame comprise:
instructions that when executed cause the at least one processor to determine that the two or more image frames are available for selection as the reference frame based on (i) metadata associated with the image frames and (ii) an alignment result associated with an image registration operation involving the image frames.

* * * * *